United States Patent [19]

Borkowicz

[11] Patent Number: 4,876,620
[45] Date of Patent: Oct. 24, 1989

[54] PROTECTION DEVICES AND ARRANGEMENTS FOR TELEPHONE LINES

[75] Inventor: Jerzy Borkowicz, Nepean, Canada

[73] Assignee: Northern Telecom Limited, Montreal, Canada

[21] Appl. No.: 250,651

[22] Filed: Sep. 29, 1988

[51] Int. Cl.[4] ............................................. H02H 3/24
[52] U.S. Cl. ...................................... 361/56; 361/57; 361/91; 361/95; 361/111; 361/119; 379/331; 379/412
[58] Field of Search ....................... 361/56, 57, 86, 87, 361/91, 92, 110, 111, 117, 118, 119; 375/331, 412; 207/30

[56] References Cited

U.S. PATENT DOCUMENTS 4,408,248 10/1983 Bulley et al. ........................... 361/91
4,710,791 12/1987 Shirato et al. ...................... 361/91 X

OTHER PUBLICATIONS

SGS Telecom Products Databook, 3rd Edition, Jul. 1986, pp. 1, 35, 36 and 37.

*Primary Examiner*—Derek S. Jennings
*Attorney, Agent, or Firm*—R. John Haley

[57] ABSTRACT

A two-wire telephone subscriber line protection arrangement consists of two protection devices each comprising a pair of complementary thyristors connected in reverse parallel with one another between a respective wire and a reference point, with their gates connected together and directly to a control terminal which has a connection to the wire via a resistance which determines an overcurrent threshold level for the device. The reference point is ground for the ring wire protection device, and is desirably the ring wire for the tip wire protection device, whereby a directional sensitivity of the protection devices is taken advantage of and the overcurrent threshold level can be reduced. Zener diodes connected between complementary thyristors provide for convenient overvoltage protection.

17 Claims, 4 Drawing Sheets

PROTECTION DEVICES AND ARRANGEMENTS FOR TELEPHONE LINES

This invention relates to protection devices and arrangements for protecting equipment coupled to telephone subscriber lines from excessive voltages and/or currents which may occur on such lines.

BACKGROUND OF THE INVENTION

It has long been known to provide one or more protection devices connected to a two-wire telephone subscriber line in order to protect equipment coupled to the line from excessive voltages and currents which may occur on the line. Such excessive voltages and currents may arise from lightning strikes, power line crosses, and currents induced from adjacent power lines.

A known protection device for use at the central office end of each of the tip and ring wires of a telephone subscriber line comprises an overvoltage protector, typically comprising a carbon block or gas tube arrangement, connected between the wire and ground, and an overcurrent protector, typically comprising a so-called heat coil which consists of a resistance connected in series with the wire and a thermally sensitive shorting mechanism which is responsive to the temperature which this resistance reaches, in response to an excessive current passing through it, to provide a permanent short of the wire to ground.

Such known devices introduce various well-known disadvantages or problems. For example the heat coil is not resettable, so that it must be identified and replaced after it has effected a protective operation, and because it is a thermal device it is slow to operate. Nevertheless, such devices continue to be used extensively for protection purposes in view of their low cost and relatively small size and the lack of economic alternatives.

Various solid state devices have been proposed for protection purposes. In particular, semiconductor voltage protectors have been proposed for replacing carbon block and gas tube arrangements. Furthermore, a solid state overvoltage/overcurrent protector is known, in the form of SGS device type L3122, which includes two SCRs (semiconductor controlled rectifiers) or thyristors with respective gates which can be triggered in response to an excessive current flowing through a resistor connected in series with the respective wire of the telephone subscriber line. Although such a device automatically resets itself on termination of the excessive current, it involves disadvantages in that triggering of at least one of the two thyristors must be indirect, i.e. via an intermediate active device such as a bipolar transistor and additional resistive components. This leads to problems of sensitivity and high power dissipation in the event of low-level a.c. fault conditions.

An object of this invention, therefore, is to provide an improved solid state protection device, and an improved protection arrangement using such devices.

SUMMARY OF THE INVENTION

According to one aspect this invention provides a protection device comprising: first and second terminals, for connection to a wire of a telephone subscriber line and to ground respectively, and a third terminal; a first SCR (semiconductor controlled rectifier) having a cathode and an anode connected to the first and second terminals respectively, and a gate adjacent to the cathode coupled directly to the third terminal; a second SCR, complementary to the first SCR, having an anode and a cathode connected to the first and second terminals respectively, and a gate adjacent to the anode coupled directly to the third terminal; and resistive means connected between the first and third terminals, whereby a predetermined current flowing via the resistive means triggers one of the SCRs to conduct current between the first and second terminals.

In order to facilitate providing an overvoltage protection function in such a protection device, the device preferably includes zener diode means having an anode connected to an electrode of the second SCR between the gate and cathode thereof, and having a cathode connected to an electrode of the first SCR between the gate and anode thereof, the zener diode means having a reverse breakdown voltage which is less than reverse breakdown voltages of junctions of each SCR adjacent said electrode thereof.

According to another aspect this invention provides a protection device for a wire of a two-wire telephone subscriber line, comprising: first and second complementary SCRs (semiconductor controlled rectifiers) having controlled paths connected in parallel with one another between first and second terminals of the device for connection to the wire and ground respectively, and having complementary gates connected together and directly to a third terminal of the device for connection to a central office termination for said wire; and zener diode means, having a reverse breakdown voltage which is less than reverse breakdown voltages of central junctions of the SCRs, connected in parallel with the central junctions of the SCRs.

According to a further aspect of this invention there is provided a protection arrangement for a two-wire telephone subscriber line comprising tip and ring wires, the arrangement comprising: a first protection device having a first terminal for connection to the ring wire, a second terminal for connection to ground, and a third terminal for connection to a central office termination for the ring wire; and a second protection device having a first terminal for connection to the tip wire, a second terminal connected to the first terminal of the first protection device, and a third terminal for connection to a central office termination for the tip wire; each protection device comprising means for conducting current between its first and third terminals and means responsive to such current exceeding a predetermined level for providing a conductive path between its first and second terminals.

In such a protection arrangement the protection devices can advantageously be of the type discussed above using complementary SCRs which are directly triggered; this provides the arrangement with a desired level of sensitivity and low power dissipation even in the event of low-level a.c. faults on the line. Furthermore, such protection devices have a directional sensitivity which is taken advantage of in this protection arrangement whereby the overcurrent threshold level, above which protection against excessive current on the line is effected, can be reduced to a low level below normal operating currents on the line (to which the protection device does not respond because of its directional sensitivity).

Thus preferably each protection device comprises two complementary SCRs (semiconductor controlled rectifiers) having controlled paths connected in parallel with one another between the first and second terminals of the device and having complementary gates connected together and directly to the third terminal of the device.

For convenient overvoltage protection the protection arrangement preferably includes two zener diode means each connected between fourth electrodes of a respective pair of complementary SCRs, said zener diode means being poled to provide reverse breakdown protection paths for voltages above a predetermined level at the first terminals of the protection devices relative to the second terminal of the first protection device. Desirably the two zener diode means are connected each between the fourth electrode of a respective one of the SCRs of the first protection device and the fourth electrode of the respective complementary one of the SCRs of the second protection device.

In each protection device preferably the means for conducting current between the first and third terminals of the device comprises resistive means connected between said first and third terminals. The resistive means conveniently includes a resistor whose resistance, which may for example be about 3 ohms for an overcurrent threshold level of about 200 mA, determines the overcurrent threshold level.

According to a further aspect this invention provides a protection arrangement for a two-wire telephone subscriber line comprising tip and ring wires, the arrangement comprising: first to fifth terminals for connection to the tip wire, a central office termination for the tip wire, the ring wire, a central office termination for the ring wire, and ground, respectively; a first SCR (semiconductor controlled rectifier) having a cathode connected to the first terminal, a gate adjacent to the cathode connected directly to the second terminal, an anode connected to the third terminal, and a fourth electrode adjacent to the anode; a second SCR, of complementary type to the first SCR, having an anode connected to the first terminal, a gate adjacent to the anode connected directly to the second terminal, a cathode connected to the third terminal, and a fourth electrode adjacent to the cathode; a third SCR, of the same type as the first SCR, having a cathode connected to the third terminal, a gate adjacent to the cathode connected directly to the fourth terminal, an anode connected to the fifth terminal, and a fourth electrode adjacent to the anode; a fourth SCR, of complementary type to the first SCR, having an anode connected to the third terminal, a gate adjacent to the anode connected directly to the fourth terminal, a cathode connected to the fifth terminal, and a fourth electrode adjacent to the cathode; and two zener diode means each connected between the fourth electrodes of a respective pair of complementary SCRs and poled for forward current conduction from an SCR complementary to the first SCR to an SCR of the type of the first SCR.

Advantageously the zener diode means are connected one between the fourth electrodes of the first and fourth SCRs and the other between the fourth electrodes of the second and third SCRs, and the arrangement includes resistive means connected between the first and second terminals and resistive means connected between the third and fourth terminals.

BRIEF DESCRIPTION OF THE DRAWINGS

The invention will be further understood from the following description with reference to the accompanying drawings, in which:

Referring to FIG. 1, a known form of telephone subscriber line protection arrangement comprises two similar protection devices 10 each of which is connected in series with a respective one of the tip T and ring R wires of a two-wire telephone subscriber line adjacent to its connection, via terminals T1 and R1, to a telephone exchange or central office. Each device 10 also has a connection to ground, and the two devices 10 are generally housed in a common package having five connections thereto.

Figure 1:
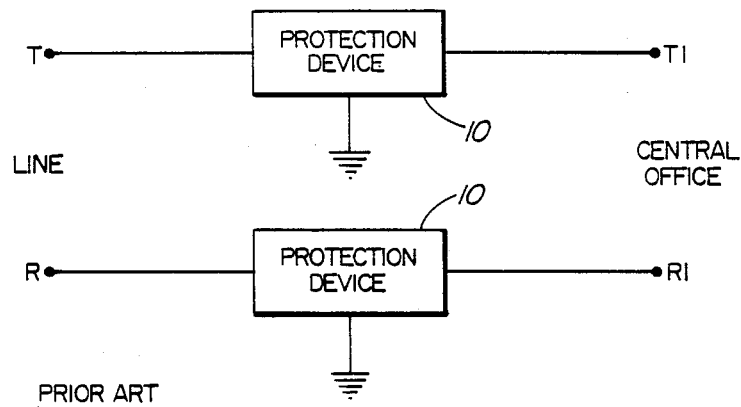
FIG. 1 illustrates a block diagram of a known form of telephone subscriber line protection arrangement.

Each protection device 10 typically comprises an overvoltage protector, such as a carbon block or gas tube arrangement, connected between the respective wire of the line and ground, and an overcurrent protector, such as a heat coil consisting of a resistive element having a resistance of about 4 ohms and a thermally sensitive shorting mechanism. The overvoltage protector shorts the wire to ground in response to an excessive voltage on the wire. In response to heating of the resistive element due to an excessive current on the respective wire of the line, the thermally sensitive shorting mechanism is activated to short the wire to ground.

The disadvantages of such known protection devices are well known, and include slowness of operation due to the thermal operation of the device, and inability to reset themselves automatically when a fault condition is removed. However, such devices continue to be used extensively for protection purposes in view of their relatively low cost and the lack of economic alternatives.

It has been proposed to replace the heat coil protection device with a solid state protection device, such as a triac or similar type of device which is triggered by a voltage dropped across a resistor in series with the respective wire of the line and connected to its gate or trigger electrode. However, such devices do not conveniently accommodate all of the fault conditions against which protection is desired. Furthermore, a triac must have a complex design of gate structure if it is to accommodate the necessary high minimum holding current while providing an acceptable gate sensitivity. Accordingly, there are considerable practical difficulties in replacing a heat coil protection device with a triac protection device. These difficulties are exacerbated by the need to maintain a low cost of the device.

In an attempt to provide a solid state protection arrangement for a telephone subscriber line, Bulley et al.

U.S. Pat. No. 4,408,248 issued Oct. 4, 1983 describes a circuit arrangement in which a semiconductor controlled rectifier (SCR) or thyristor is connected between two d.c. terminals of a six-diode bridge whose three a.c. terminals are connected to the tip and ring wires of the line and to ground, respectively. Overcurrent sensors are connected in series with the tip and ring wires on the central office side of the bridge, and these and an overvoltage sensor coupled thereto serve to trigger the thyristor to conduct in response to an excessive voltage and/or current on the line.

This protection circuit arrangement has the advantages that the diode bridge eliminates the need for a bidirectional switch, the reverse characteristic of the thyristor is not important, and the arrangement resets itself when excessive currents and voltages are removed, if the thyristor has a sufficiently high minimum holding current. However, this arrangement has disadvantages in that it requires a relatively large number of components, namely six diodes, a thyristor, and control circuitry.

In addition, this protection arrangement uses indirect triggering; in other words, the thyristor is triggered only after other active devices become conductive, and currents flow via associated resistances. For low-level a.c. fault conditions, this results in low sensitivity of the triggering action and high power dissipation by the protection arrangement, which presents a problem for compact arrangements of protection packages serving many telephone subscriber lines.

Figure 2:
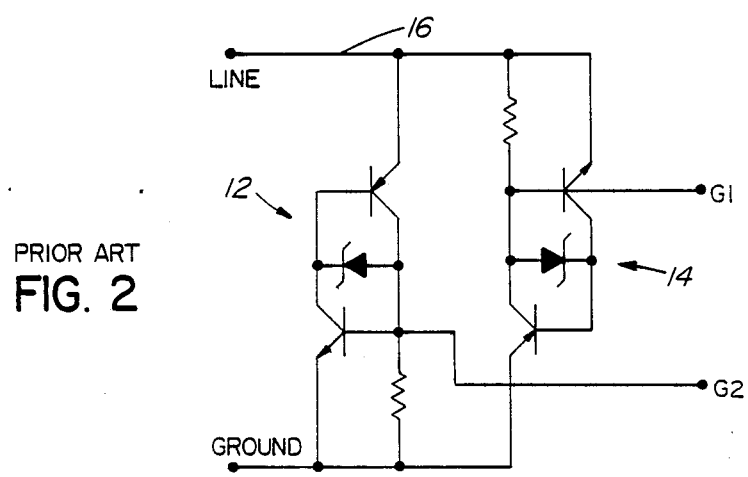
FIG. 2 schematically illustrates a known form of line protector which may be used in the protection arrangement of FIG. 1.

In order to avoid the need for the diode bridge, and at the same time avoid the use of a triac as described above, it is possible to provide a protection device which uses two thyristors as triggerable protection switches, one for each polarity of excessive voltage and/or current. One such known device is packaged as a type L3122 bidirectional transient overvoltage/overcurrent protector from SGS Telecom Products. FIG. 2 illustrates an electrical form of this device; one such device and associated control circuitry would be required for each wire of a two-wire telephone subscriber line.

In FIG. 2, two substantially identical thyristors 12, 14 are connected in parallel with one another between the respective wire 16 of the line and ground, and hence must be of a reverse blocking type. Each thyristor is illustrated by its conventional electrical equivalent of two bipolar transistors of opposite polarity, each with its base connected to the other's collector, with a zener diode representing the reverse voltage breakdown characteristic of these common junctions of the transistors, and a resistive connection in parallel with the base-emitter junction of the NPN transistor, i.e. the gate-cathode junction of the thyristor.

In the device shown in FIG. 2, the thyristors have separate gates G1 and G2, which can not be directly interconnected and which must be triggered appropriately for the opposite polarities of overcurrent against which protection is to be provided. This necessitates an overall protection circuit, for each respective wire of the line, which includes control circuitry such as that illustrated in FIG. 3.

Figure 3:
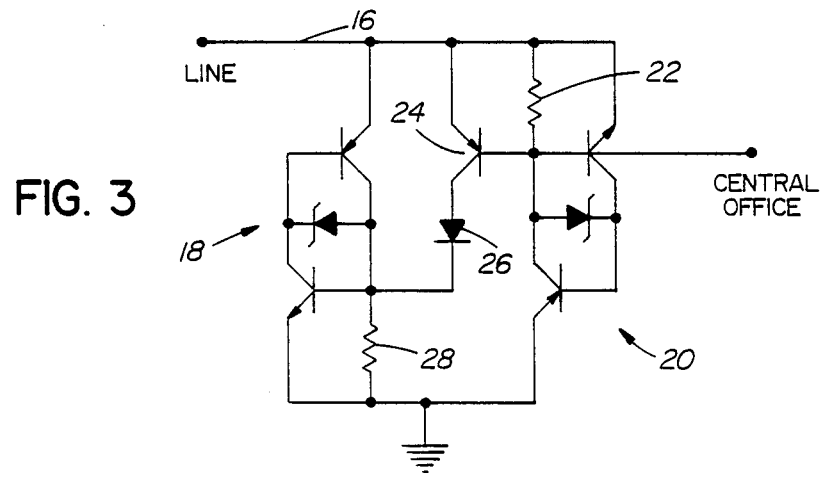
FIG. 3 schematically illustrates a protection circuit arrangement including the line protector of FIG. 2.

In FIG. 3, identical thyristors 18 and 20 are connected in reverse parallel with one another between the telephone subscriber line wire 16 and ground. A resistor 22 is connected in series with the wire 16 at the central office end thereof, the central office side of the resistor being connected to the gate of the thyristor 20. Consequently, if current flowing in the wire 16 is sufficient and is in a direction to forward bias the thyristor 20's NPN transistor's base-emitter junction, the thyristor 20 is triggered to conduct current between the wire 16 and ground.

For current flowing in the wire 16 in the opposite direction, the thyristor 18 is similarly triggered to conduct current between the wire 16 and ground. However, for this opposite polarity overcurrent protection an inverting and level-shifting function is required. This is provided as illustrated in FIG. 3 by a PNP transistor 24, diode 26, and resistor 28. The transistor 24 has its emitter connected to the wire 16 and hence to one end of the resistor 22, its base connected to the central office terminal of the wire and hence to the other end of the resistor 22 and the gate of the thyristor 20, and its collector connected via the diode 26 and the resistor 28 to ground, the junction between the diode 26 and the resistor 28 being connected to the gate of the thyristor 18. The diode 26 serves to block current which could otherwise flow between the wire 16 and ground via the (forward biassed) emitter-base junction of the thyristor 20's NPN transistor, the base-collector junction of the transistor 24, and the resistor 28.

In the arrangement of FIG. 3, the resistors 22 and 28, the transistor 24 and the diode 26 can be integrated with the two thyristors 18 and 20. However, the parallel connection of the thyristors means that they can not be conveniently integrated into a single chip. In addition, this arrangement still has the disadvantage that the thyristor 18 is indirectly triggered via the transistor 24, resulting in low sensitivity and high power dissipation in the event of low-level a.c. faults as mentioned above.

For overvoltage protection, in the arrangement of FIG. 3 it is intended that the thyristors 18 and 20 break down to short excessive positive and negative voltages, respectively, on the wire 16 to ground. To achieve this, it is necessary for the reverse breakdown voltages of the PN junctions of the thyristor to be selected appropriately in relation to one another. For example, for a positive overvoltage on the wire 16 with respect to ground, it is desired that the central PN junction, represented by the zener diode, of the thyristor 18 break down in the reverse direction to provide protection, but this will not happen if the thyristor 20's PNP transistor's base-emitter junction has a lower reverse breakdown voltage, because then a path would first occur via this junction, the forward-biassed central junction, represented by the zener diode, of the thyristor 20, and the forward-biassed base-emitter Junction of the transistor 24. The selection of appropriate reverse breakdown voltages within the thyristors can present considerable practical problems in the design and implementation of these devices.

Figure 4:
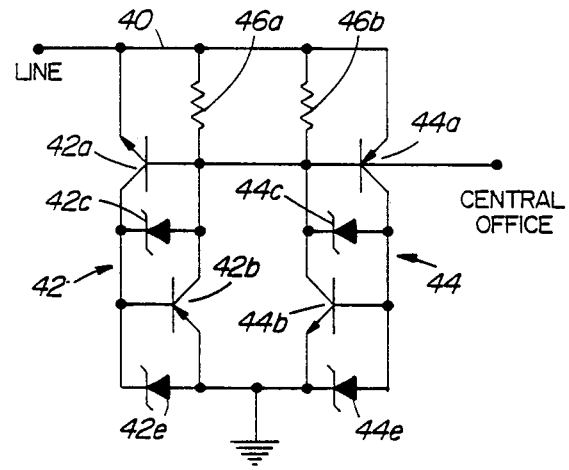
FIG. 4 schematically illustrates a line protector in accordance with this invention.

FIG. 4 illustrates, in a similar manner to that of FIG. 3, a protection arrangement in accordance with this invention. The arrangement of FIG. 4 comprises two complementary thyristors 42 and 44, connected with their main (anode-cathode) paths in parallel between one wire 40 of a telephone subscriber line and ground. The thyristor 42 is illustrated in its electrical equivalent form as comprising an NPN transistor 42a, a PNP transistor 42b, and zener diodes 42c and 42e, with the base and collector of the transistor 42a connected to the collector and base, respectively, of the transistor 42b. The zener diodes 42c and 42e connected between the collector-base and emitter-base junctions of the transistor 42b represent the reverse breakdown characteristics of these PN junctions of the thyristor. A resistor 46a is connected between the base and emitter of the transistor 42a, and may be partly or wholly integrated into the thyristor structure. The emitters of the transistors 42a and 42b are connected to the wire 40 and ground respectively and constitute the cathode and anode respectively of the thyristor 42, and the base of the transistor 42a, constituting the gate of the thyristor 42, is connected to the central office terminal of the wire 40 whereby the resistor 46a is in series with the wire 40.

Similarly but conversely, the thyristor 44 comprises a PNP transistor 44a, an NPN transistor 44b, and zener diodes 44c and 44e, with the collectors and bases of the transistors interconnected and the zener diodes representing reverse breakdown characteristics of PN junctions of the thyristor. A resistor 46b is connected between the base and emitter of the transistor 44a, whose emitter and base constitute the anode and gate respectively of the thyristor 44 and are connected to the wire 40 and the central office terminal respectively, whereby the resistor 46b is in series with the wire and in parallel with the resistor 46a. The emitter of the transistor 44b constitutes the cathode of the thyristor 44 and is grounded. The resistor 46b may be partly or wholly integrated into the thyristor structure.

The thyristors 42 and 44 are reverse blocking, and are desirably matched complementary devices especially in respect of their forward and reverse blocking capabilities. They are preferably either high minimum holding current devices, or of gate turn-off design having low gate series resistance, to ensure unlatching or turning off of the devices after being triggered. They may be conveniently provided as two individual chips, one for each thyristor. The complementary nature of the thyristors can be clearly seen in that the thyristor 42 has a P-type gate, whereas the thyristor 44 has an N-type gate, the gates being represented by the bases of the transistors 42a and 44a respectively.

The thyristor 44 is triggered by an overcurrent flowing in the wire 40 from the line to the central office via the parallel resistors 46a and 46b, referred to collectively below as a resistor 46, forward biassing the base-emitter junction of the transistor 44a. Conversely, the thyristor 42 is triggered by an overcurrent flowing in the opposite direction through the resistor 46 to forward bias the base-emitter Junction of the transistor 42a. In both cases the triggering is direct, i.e. the resistors 46a and 46b are connected directly to the gates of the thyristors, and there are no intermediate active devices. Consequently power dissipation in the event of low-level a.c. faults is greatly reduced in comparison to the protection devices discussed above. In addition, this direct triggering results in much greater sensitivity than indirect triggering as in the prior art.

Figure 5:
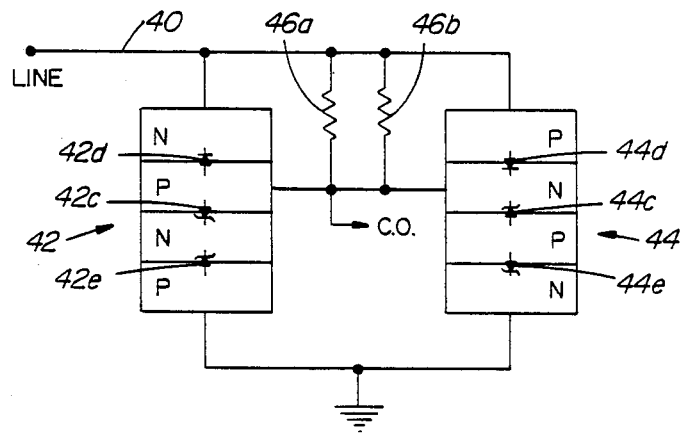
FIG. 5 shows an alternative representation of the line protector of FIG. 4.

FIG. 5 illustrates the same line protector as FIG. 4 in an alternative manner, showing the PNPN structure of the thyristors 42 and 44 diagrammatically rather than as a schematic circuit. FIG. 5 illustrates the PN junction zener diodes 42c and 42e of the thyristor 42, as well as a diode 42d representing its other PN junction, to represent the polarity and characteristics of these junctions, and illustrates similar components 44c, 44d, and 44e for the thyristor 44. The reverse characteristics of the diodes 42d and 44d are unimportant because these junctions are oppositely poled and in parallel with one another.

Referring to FIG. 5, an excessive current flowing in the wire 40 from the line to the central office (C.O.) will forward bias the base-emitter junction of the transistor 44a to turn on the thyristor 44 and conduct the current to ground. In the absence of a sufficient current flow via the resistor 46 to turn on the thyristor 44 in this manner, an excessive positive voltage on the wire 40 causes reverse breakdown of either the zener diode 44c, current flowing via the diodes 44d, 44c, and 44e, or the zener diode 42e, current flowing via the diodes 44d, 42c, and 42e, depending on whether the zener diode 42e or 44c has a lower reverse breakdown voltage. In either case the junction 44d is forward biassed so that the thyristor 44 is triggered into conduction to protect against the excessive voltage. The thyristor 42 operates conversely in response to an opposite direction of current flow or polarity on the wire 40.

In the protector of FIGS. 4 and 5 the zener diodes can all have approximately the same reverse breakdown voltages, as it is immaterial which diode breaks down in response to an excessive voltage, the relevant thyristor being triggered in any event. This is not the case with the circuit of FIG. 3; in that case an excessive positive voltage on the line 16 may cause reverse breakdown of the base-emitter junction of the thyristor 20's PNP transistor (if it has a lower reverse breakdown voltage than the central Junction of the thyristor 18, as would usually be the case for identical thyristors) via the base-emitter of the transistor 24 and the central junction (base-collector junctions) of the thyristor 20, and the thyristor 18 would not be triggered to protect against the excessive voltage.

Figure 6:
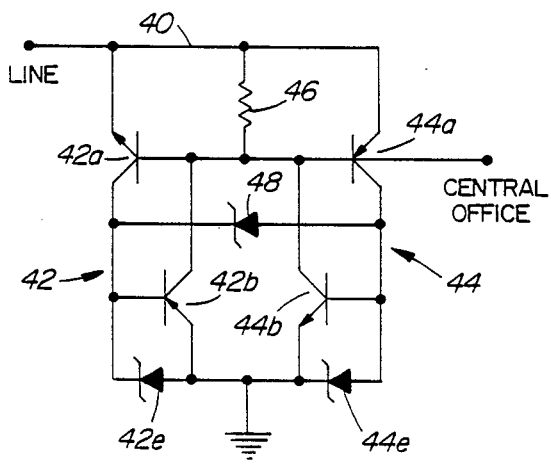
FIG. 6 schematically illustrates a modified form of line protector in accordance with this invention.
Figure 7:
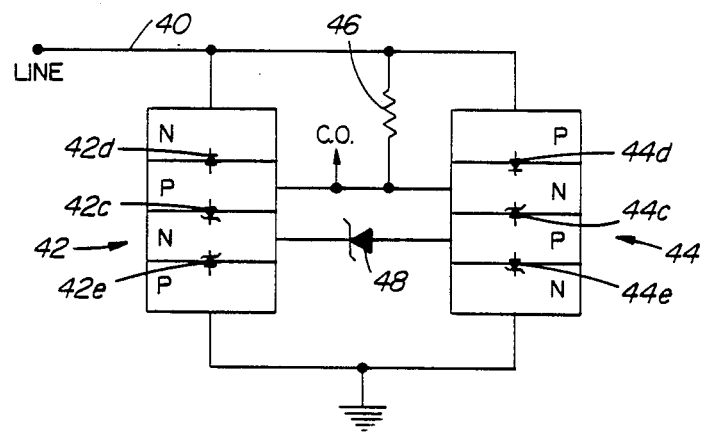
FIG. 7 shows an alternative representation of the line protector of FIG. 6.

FIGS. 6 and 7 illustrate, in the same manner as FIGS. 4 and 5 respectively, an alternative but closely similar form of line protector, in which the resistors 46a and 46b of FIGS. 4 and 5 are replaced by a single resistor 46 which may be external to the thyristors 42 and 44 so that it can be conveniently adjusted to determine the overcurrent sensitivity of the protection arrangement. In addition, in the protector of FIGS. 6 and 7 a zener diode 48, which may be external to the thyristors 42 and 44 or may be integrated therewith, is connected between the collectors of the transistors 42a and 44a (FIG. 6), which constitute fourth electrodes of the thyristors, poled for forward current flow in a direction from the thyristor 44 towards the thyristor 42. Otherwise the protector of FIGS. 6 and 7 has the same circuit arrangement as the protector of FIGS. 4 and 5.

Whereas in the protector of FIGS. 4 and 5 the zener diodes 42c, 42e and 44c, 44e would desirably have reasonably matched reverse breakdown voltages in a desired range of for example about 260 to 390 volts, in the protector of FIGS. 6 and 7 the zener diode 48 can have a reverse breakdown voltage in this range and the zener diodes 42c, 44e and 44c, 44e inherent in the thyristor structure can all have arbitrary higher reverse breakdown voltages.

The overcurrent operation of the protector of FIGS. 6 and 7 is substantially the same as for the protector of FIGS. 4 and 5, an excessive current through the resistor 46 forward biassing the base-emitter junction of the transistor 42a or 44a, depending on the current direction, to turn on the thyristor 42 or 44 respectively. For overvoltage protection, however, the protector of FIGS. 6 and 7 provides the advantage that the voltage to which it responds is independent of the polarity of the voltage, i.e. overvoltage protection is identical for both polarities.

More particularly, a positive excessive voltage on the wire 40, without an excessive current through the resistor 46, is conducted to ground by a path via the forward-biassed diodes 44d (44a emitter-base junction) and 42c (42a, 42b collector-base junctions), reverse breakdown of the zener diode 48, and the forward-biassed diode 44e (44b base-emitter junction) resulting in triggering of the thyristor 44. Conversely, a negative excessive voltage on the wire 40, without an excessive current through the resistor 46, is conducted to ground by a path via the forward-biassed diodes 42d (42a emitter-base junction) and 44c (44a, 44b collector-base junctions), reverse breakdown of the zener diode 48, and the forward-biassed diode 42e (42b base-emitter junction) resulting in triggering of the thyristor 42. In both cases, the reverse breakdown voltage of the zener diode 48 determines the magnitude of excessive voltage at which the protector operates.

Although FIGS. 6 and 7 each show a single zener diode 48 connected between the thyristors 42 and 44, it should be appreciated that this may alternatively be constituted by two zener diodes connected in series to provide an equivalent reverse breakdown voltage, whereby each diode can be associated with a respective one of the thyristors and may optionally be integrated therewith. The junction between such two zener diodes can optionally be connected to the central office terminal and the gates of the thyristors so that these two zener diodes are completely in parallel with the internal zener diodes 42c and 44c of the thyristors, while still providing the desired reverse breakdown voltages, whereby the external fourth electrode connection to an integrated thyristor and zener diode structure can be eliminated.

It is usual for thyristor protection devices to refer to voltage polarities of the ground and central office connections with respect to the potential of the line connection as a reference. In this manner, four quadrants, with respective combinations of relative voltage polarities, can be defined for operation of the device, as follows:

| Quadrant | Relative Voltage Polarity | |
|---|---|---|
|  | Ground | Central Office |
| 1 | + | + |
| 2 | − | + |
| 3 | − | − |
| 4 | + | − |

An analysis of the protection arrangements described above shows that the arrangements of FIGS. 3 to 7 can only be triggered in quadrants 1 and 3, whereas the arrangement described in Bulley et al. U.S. Pat. No. 4,408,248 can also be triggered in one of the even quadrants; triac arrangements can be triggered only in quadrants 1 and 2, or 3 and 4, or all quadrants, but not only in quadrants 1 and 3; and heat coil arrangements can be triggered in all quadrants. The triggering of the protection arrangements of FIGS. 3 to 7 only in the odd quadrants gives these arrangements a directional sensitivity, which can be utilized as described below to improve significantly the performance of protection arrangements for telephone subscriber lines.

More particularly, with conventional protection arrangements for telephone subscriber lines the so-called ring trip current presents a problem. This is the current which occurs temporarily when the telephone handset is lifted in response to ringing, while a ringing signal voltage is still applied to the ring wire at the central office, and may be of the order of 450 mA. All other currents which occur on the line in normal operation are less than about 200 mA. It would be desirable to set the excessive current threshold of the protection arrangement to a little more than 200 mA so that the sensitivity of the protection arrangement to overcurrent is optimized, but it has to be set, in known protection arrangements which do not include thermal delays, to more than 450 mA to accommodate the ring trip current.

However, using the quadrant convention given above, it can be determined that, for a directionally sensitive protection device, as described above with reference to FIGS. 3 to 7, connected in series with the ring wire to which the ringing signal and battery voltage are applied in the central office, the ringing current and particularly the ring trip current do not occur in quadrant 1 or quadrant 3, which are the only quadrants in which this protection device can be triggered. Fault currents for such a protection device arise from the line side of the device and always appear in quadrant 1 and/or quadrant 3.

Accordingly, the directionally sensitive ring wire protection device can be set to have an overcurrent threshold level which is less than the ring trip current, and may conveniently be a little more than about 200 mA which is as desired. The resistance of the resistor 46 determines the overcurrent threshold level; a resistance of about 3 ohms provides the necessary voltage drop of about 0.6 volts to forward bias the respective thyristor PN junction to turn the thyristor on at an overcurrent threshold level of about 200 mA.

The tip wire protection device can be set to have the same overcurrent threshold level as the ring wire protection device. For the tip wire protection device the ring trip current will occur in quadrant 1 or 3, so that the protection device will be triggered temporarily, until the ringing signal is removed. This temporary triggering of the tip wire protection device presents no disadvantage except that it bypasses a resistive termination (if present) of the tip wire in the central office, whereby an additional load may be placed on the ringing signal generator in the central office and the ring trip current may increase to levels greater than 450 mA. This condition is very temporary, because the tip wire protection device automatically resets itself when the ringing signal generator is disconnected as a result of detection in the central office of the ring trip current.

Even this disadvantage is avoided, and even lower overcurrent threshold levels can be used, with the improved protection arrangement described below with reference to FIGS. 8 and 9.

Figure 8:
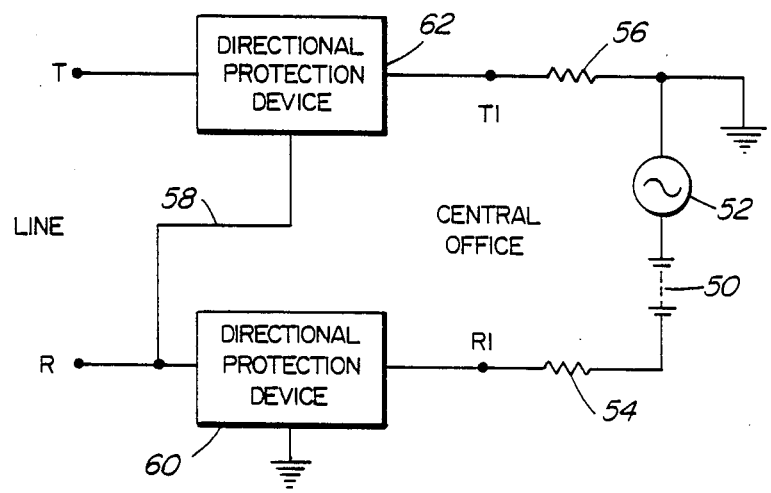
FIG. 8 illustrates a block diagram of a telephone subscriber line protection arrangement in accordance with this invention.

FIG. 8 illustrates an improved protection arrangement for a two-wire telephone subscriber line comprising ring and tip wires which are connected to corresponding terminals R and T. At the central office side of the protection arrangement, a ring terminal R1 is supplied with a −48 V battery feed from a battery 50 and with signals (e.g. the ringing signal discussed above) from a signal source 52, via a resistor 54, and a tip terminal T1 is grounded via a resistor 56. A directional protection device 60, for example as described above with reference to one of FIGS. 3 to 7, is connected in series with the ring wire between the terminals R and R1, with its third terminal grounded in conventional manner. Another, similar, directional protection device 62 is connected in series with the tip wire between the terminals T and T1. Instead of being grounded in known manner as illustrated in FIG. 1, the third terminal of the directional protection device 62 is connected via a wire 58 to the terminal R, i.e. to the ring wire connection of the device 60 on the line side thereof.

As a result of this connection of the tip wire protection device 62, fault conditions on the tip wire are determined in relation to conditions on the ring wire, not relative to ground. Thus for example the ring trip current, which flows from the source 52 via the protection device 60 (which is directionally sensitive and hence not triggered as described above) and the ring wire of the line and returns via the tip wire and the protection device 62, does not now trigger the protection device 62 because this protection device is referenced to the ring wire by its connection thereto. For an excessive current on the tip wire which has not originated in the central office and passed via the protection device 60, however, the protection device 62 is triggered because this current appears in quadrant 1 or quadrant 3 as discussed above. The resulting current from the protection device 62 to the ring wire also appears in quadrant 1 or 3 for the protection device 60, which consequently is also triggered to conduct this current to ground just as if the current had appeared originally via the ring wire and its terminal R. Thus in this situation both of the protection devices 60 and 62 are triggered into conduction.

Because, in the arrangement of FIG. 8, the protection device 60 does not respond to voltages and currents originating in the central office, as they are not in quadrant 1 or 3, and the protection device 62 does not respond to loop currents (equal currents flowing in opposite directions on the tip and ring wires) in view of its reference connection to the ring wire terminal R, this protection arrangement is very insensitive to currents and voltages which occur in normal operation and originate in the central office. As a result, the overcurrent threshold level of these devices can be set (e.g. by selecting an appropriate value of resistance for the resistors 46) to a very low level, if desired much less than the normal operating currents of about 200 mA as discussed above.

This provides some advantages concerning the resistors 54 and 56. These are conventionally physically large resistors in order to be capable of dissipating large amounts of power which may occur due to substantial currents flowing through them which are not sufficient to trigger conventional overcurrent protection devices. By reducing the overcurrent threshold level in the manner enabled by the protection arrangements of this invention, the power rating of these resistors, and consequently their size and cost and related thermal considerations, can be reduced. For example, the overcurrent threshold level may be reduced by an order of magnitude to a low level of the order of 25 mA, because of the directional sensitivity of the protection arrangement, instead of its conventional level of hundreds of milliamps. Furthermore, the overcurrent sensitivity of the protection arrangement facilitates the use of a current-controlled subscriber line interface card for terminating the telephone subscriber line in the central office.

Figure 9:
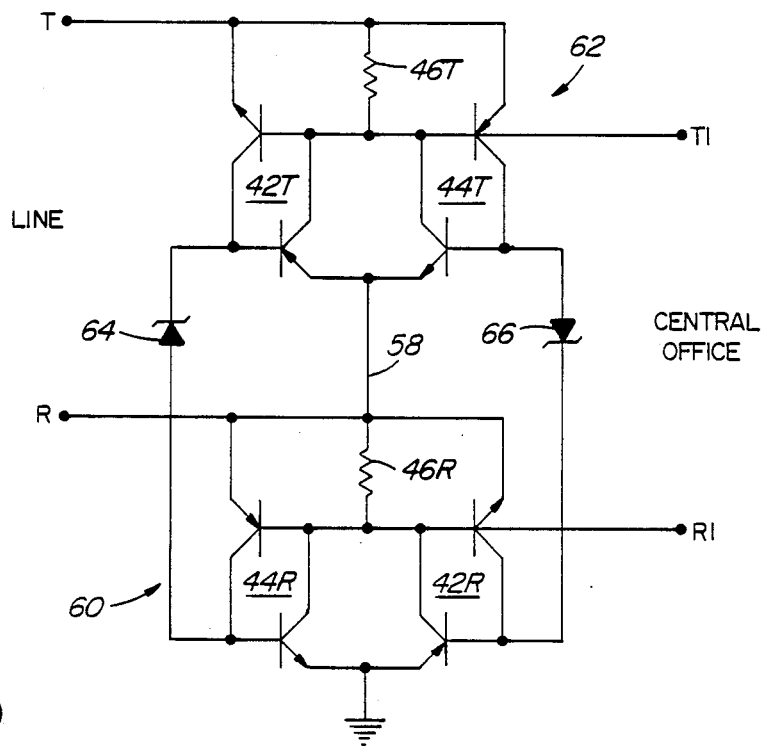
FIG. 9 schematically illustrates a telephone subscriber line protection arrangement in accordance with this invention.

FIG. 9 illustrates a protection arrangement as in FIG. 8 using protection devices 60 and 62 which are each as illustrated in FIGS. 6 and 7 except for replacement of the zener diode 48 in each device by zener diodes 64 and 66 connected between the protection devices as described further below. The protection device 60 thus comprises complementary thyristors 42R and 44R, and a resistor 46R, for the ring wire, and the protection device 62 comprises complementary thyristors 42T and 44T, and a resistor 46T, for the tip wire. FIG. 9 also identifies the connection wire 58 between the protection devices 60 and 62.

An overcurrent on the ring wire appears to the protection device 60 in quadrant 1 or 3, and results in triggering the respective one of the thyristors 42R and 44R in response to the polarity and magnitude of voltage dropped by this current passing through the resistor 46R, in the same manner as already described above, whereby this current is shunted to ground. Similarly, an overcurrent on the tip wire triggers the respective one of the thyristors 42T and 44T in the tip wire protection device 62 as a result of the voltage dropped across the resistor 46T. The overcurrent is thereby shunted to the ring wire via the connection wire 58, and may also cause triggering of the protection device 60 in the same manner as an overcurrent originating on the ring wire.

In the absence of an overcurrent condition, an excessive positive voltage, with respect to ground, on the ring wire is shorted to ground via a path including the wire 58, the forward-biased emitter-base junction of the PNP transistor of the thyristor 42T, the zener diode 64 in reverse breakdown, and the forward-biased base-emitter junction of the NPN transistor of the thyristor 44R causing triggering of the thyristor 44R. Conversely, an excessive negative voltage on the ring wire is shorted to ground via a path including the wire 58, emitter-base junction of the NPN transistor of the thyristor 44T, the zener diode 66 in reverse breakdown, and the base-emitter junction of the PNP transistor of the thyristor 42R causing triggering of the thyristor 42R.

Also, in the absence of an overcurrent condition, an excessive positive voltage, with respect to ground, on the tip wire is shorted to ground via a path including the thyristor 44T's PNP transistor's forward-biased emitter-base junction, the forward-biased central junction (base-collector connections) of the thyristor 42T, the zener diode 64 in reverse breakdown, and the thyristor 44R's NPN transistor's forward-biased base-emitter junction causing triggering of the thyristors 44T and 44R. Conversely, an excessive negative voltage on the tip wire is shorted to ground via a path including the thyristor 42T's NPN transistor's forward-biased emitter-base junction, the forward-biased central junction (base-collector connections) of the thyristor 44T, the zener diode 66 in reverse breakdown, and the thyristor 42R's PNP transistor's forward-biased base-emitter junction causing triggering of the thyristors 42T and 42R.

In practice, the protection devices 60 and 62 are much more likely to be triggered by excessive currents than by excessive voltages, because they can have a relatively low overcurrent threshold level. For example, with the resistor 54 (FIG. 8) having a resistance of 200 ohms as is conventionally typical, an overcurrent threshold level of 200 mA will be reached with a voltage of only 40 volts at the terminal R, whereas the zener diodes 64 and 66 may have reverse breakdown voltages of the order of 200 to 300 volts. Accordingly, an excessive current will normally occur to trigger the protection devices 62 and 60 before an excessive voltage is reached. However, in the event that the resistors 54 and 56 have higher resistances, or in the event that the terminals T1 and/or R1 are disconnected, an overvoltage condition at the terminals T and/or R can occur without an overcurrent condition arising, and in this case the zener diodes 64 and 66 will act in the overvoltage manner described above. Similar comments apply in respect of the other protection arrangements described above.

The zener diodes 64 and 66, and likewise the resistors 46T and 46R in whole or in part, may if desired be integrated with the thyristors 42T, 44T, 42R, and 44R, or may be provided externally of the thyristors. In addition, the thyristors may be integrated in two complementary thyristor pairs, in order to reduce the total number of integrated circuit chips required to form the combined protection arrangement of FIG. 9.

The protection arrangement described above with reference to FIGS. 8 and 9 can be used as a primary protector at a main distribution frame (MDF) of the central office as illustrated above, or can be used as a secondary protector directly on a subscriber line interface card, which also includes the resistors 54, 56 and line interface circuitry, within the central office itself, with or without a conventional type of primary protector at the MDF. In the latter case, part or all of the resistance of the resistors 54, 56 can be incorporated within the protection devices as part or all of the resistors 46R, 46T respectively. In this manner the resistance 46 across which an overcurrent produces a triggering level for firing one of the thyristors can be increased, whereby the overcurrent threshold level can be decreased, without any increase in the total resistance connected in series with the tip and ring wires.

Figure 10:
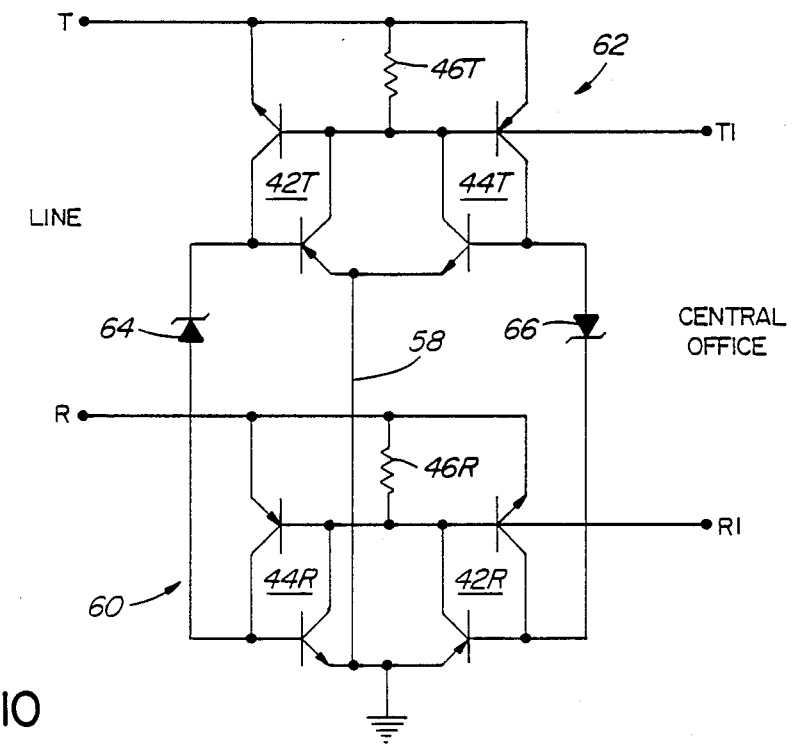
FIG. 10 schematically illustrates a modification of the protection arrangement of FIG. 9.

It should also be appreciated that the protection arrangement of FIG. 9 may be modified by connecting the wire 58 to ground, as in the prior art, rather than to the ring wire as described above, the zener diodes 64 and 66 still being connected and operating in the manner described above. Such a modified protection arrangement is illustrated in FIG. 10, and its operation will be apparent from the foregoing description.

Numerous other modifications, variations, and adaptations may be made to the described embodiments without departing from the scope of the invention as defined in the claims.

What is claimed is:

1. A protection device comprising:
   first and second terminals, for connection to a wire of a telephone subscriber line and to ground respectively, and a third terminal;
   a first SCR (semiconductor controlled rectifier) having a cathode and an anode connected to the first and second terminals respectively, and a gate adjacent to the cathode coupled directly to the third terminal;
   a second SCR, complementary to the first SCR, having an anode and a cathode connected to the first and second terminals respectively, and a gate adjacent to the anode coupled directly to the third terminal; and
   resistive means connected between the first and third terminals, whereby a predetermined current flowing via the resistive means triggers one of the SCRs to conduct current between the first and second terminals.

2. A protection device as claimed in claim 1 and including zener diode means having an anode connected to an electrode of the second SCR between the gate and cathode thereof, and having a cathode connected to an electrode of the first SCR between the gate and anode thereof, the zener diode means having a reverse breakdown voltage which is less than reverse breakdown voltages of junctions of each SCR adjacent said electrode thereof.

3. A protection device for a wire of a two-wire telephone subscriber line, comprising:
   first and second complementary SCRs (semiconductor controlled rectifiers) having controlled paths connected in parallel with one another between first and second terminals of the device for connection to the wire and ground respectively, and having complementary gates connected together and directly to a third terminal of the device for connection to a central office termination for said wire; and
   zener diode means, having a reverse breakdown voltage which is less than reverse breakdown voltages of central junctions of the SCRs, connected in parallel with the central junctions of the SCRs.

4. A protection device as claimed in claim 3 and including resistive means connected between the first and third terminals of the device.

5. A protection arrangement for a two-wire telephone subscriber line comprising tip and ring wires, the arrangement comprising:
   a first protection device having a first terminal for connection to the ring wire, a second terminal for connection to ground, and a third terminal for connection to a central office termination for the ring wire; and
   a second protection device having a first terminal for connection to the tip wire, a second terminal connected to the first terminal of the first protection device, and a third terminal for connection to a central office termination for the tip wire;
   each protection device comprising means for conducting current between its first and third terminals and means responsive to such current exceeding a predetermined level for providing a conductive path between its first and second terminals.

6. A protection arrangement as claimed in claim 5 wherein each protection device comprises two complementary SCRs (semiconductor controlled rectifiers) having controlled paths connected in reverse parallel with one another between the first and second terminals of the device and having complementary gates connected together and directly to the third terminal of the device.

7. A protection arrangement as claimed in claim 6 and including two zener diode means each connected between fourth electrodes of a respective pair of complementary SCRs, said zener diode means being poled to provide reverse breakdown protection paths for voltages above a predetermined level at the first terminals of the protection devices relative to the second terminal of the first protection device.

8. A protection arrangement as claimed in claim 7 wherein the two zener diode means comprise zener diode means in each protection device connected in parallel with the central junctions of the SCRs of the protection device.

9. A protection arrangement as claimed in claim 7 wherein the two zener diode means are connected each between the fourth electrode of a respective one of the SCRs of the first protection device and the fourth electrode of the respective complementary one of the SCRs of the second protection device.

10. A protection arrangement as claimed in claim 5 wherein in each protection device the means for conducting current between the first and third terminals of the device comprises resistive means connected between said first and third terminals.

11. A protection arrangement as claimed in claim 7 wherein in each protection device the means for conducting current between the first and third terminals of the device comprises resistive means connected between said first and third terminals.

12. A protection arrangement for a two-wire telephone subscriber line comprising tip and ring wires, the arrangement comprising:
first to fifth terminals for connection to the tip wire, a central office termination for the tip wire, the ring wire, a central office termination for the ring wire, and ground, respectively;
a first SCR (semiconductor controlled rectifier) having a cathode connected to the first terminal, a gate adjacent to the cathode connected directly to the second terminal, an anode connected to the third terminal, and a fourth electrode adjacent to the anode;
a second SCR, of complementary type to the first SCR, having an anode connected to the first terminal, a gate adjacent to the anode connected directly to the second terminal, a cathode connected to the third terminal, and a fourth electrode adjacent to the cathode;
a third SCR, of the same type as the first SCR, having a cathode connected to the third terminal, a gate adjacent to the cathode connected directly to the fourth terminal, an anode connected to the fifth terminal, and a fourth electrode adjacent to the anode;
a fourth SCR, of complementary type to the first SCR, having an anode connected to the third terminal, a gate adjacent to the anode connected directly to the fourth terminal, a cathode connected to the fifth terminal, and a fourth electrode adjacent to the cathode; and
two zener diode means each connected between the fourth electrodes of a respective pair of complementary SCRs and poled for forward current conduction from an SCR complementary to the first SCR to an SCR of the type of the first SCR.

13. A protection arrangement as claimed in claim 12 wherein the zener diode means are connected one between the fourth electrodes of the first and fourth SCRs and the other between the fourth electrodes of the second and third SCRs.

14. A protection arrangement as claimed in claim 12 and including resistive means connected between the first and second terminals and resistive means connected between the third and fourth terminals.

15. A protection arrangement as claimed in claim 13 and including resistive means connected between the first and second terminals and resistive means connected between the third and fourth terminals.

16. A protection arrangement for a two-wire telephone subscriber line comprising tip and ring wires, the arrangement comprising:
first to fifth terminals for connection to the tip wire, a central office termination for the tip wire, the ring wire, a central office termination for the ring wire, and ground, respectively;
a first SCR (semiconductor controlled rectifier) having a cathode connected to the first terminal, a gate adjacent to the cathode connected directly to the second terminal, an anode connected to the fifth terminal, and a fourth electrode adjacent to the anode;
a second SCR, of complementary type to the first SCR, having an anode connected to the first terminal, a gate adjacent to the anode connected directly to the second terminal, a cathode connected to the fifth terminal, and a fourth electrode adjacent to the cathode;
a third SCR, of the same type as the first SCR, having a cathode connected to the third terminal, a gate adjacent to the cathode connected directly to the fourth terminal, an anode connected to the fifth terminal, and a fourth electrode adjacent to the anode;
a fourth SCR, of complementary type to the first SCR, having an anode connected to the third terminal, a gate adjacent to the anode connected directly to the fourth terminal, a cathode connected to the fifth terminal, and a fourth electrode adjacent to the cathode; and
two zener diode means, one connected between the fourth electrodes of the first and fourth SCRs and the other connected between the fourth electrodes of the second and third SCRs, each poled for forward current conduction from an SCR complementary to the first SCR to a SCR of the type of the first SCR.

17. A protection arrangement as claimed in claim 16 and including resistive means connected between the first and second terminals and resistive means connected between the third and fourth terminals.

* * * * *